US012812425B2

(12) United States Patent
Olsen

(10) Patent No.: US 12,812,425 B2
(45) Date of Patent: Nov. 24, 2026

(54) CONSTANT AVERAGE UE THROUGHPUT IN CELLULAR WIRELESS NETWORKS

(71) Applicant: T-MOBILE INNOVATIONS LLC, Overland Park, KS (US)

(72) Inventor: Brian Allan Olsen, Kirkland, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 264 days.

(21) Appl. No.: 18/610,806

(22) Filed: Mar. 20, 2024

(65) Prior Publication Data

US 2025/0301345 A1 Sep. 25, 2025

(51) Int. Cl.
*H04W 24/08* (2009.01)

(52) U.S. Cl.
CPC .................................... *H04W 24/08* (2013.01)

(58) Field of Classification Search
CPC .. H04W 24/08; H04W 24/02; H04W 52/0206
See application file for complete search history.

(56) References Cited

FOREIGN PATENT DOCUMENTS

CN 108322274 A * 7/2018 ........ H04W 28/0236

* cited by examiner

*Primary Examiner* — Said M Elnoubi
(74) *Attorney, Agent, or Firm* — SHOOK, HARDY & BACON L.L.P.

(57) ABSTRACT

Systems and methods configured to reduce unnecessary radio operation during lower and/or non-traffic times are described herein. More particularly, in aspects set forth herein, systems and methods enable a carrier to be turned on or off according to customer demand. The system may determine one or more frequency bands and/or channels to activate and/or deactivate and may generate configuration settings to send to the one or more nodes. In the context of cellular networks, optimizing spectrum usage and network capacity is important for efficient operation and minimizing waste, including energy waste.

20 Claims, 6 Drawing Sheets

CONSTANT AVERAGE UE THROUGHPUT IN CELLULAR WIRELESS NETWORKS

SUMMARY

A high-level overview of various aspects of the present technology is provided in this section to introduce a selection of concepts that are further described below in the detailed description section of this disclosure. This summary is not intended to identify key or essential features of the claimed subject matter, nor is it intended to be used as an aid in isolation to determine the scope of the claimed subject matter.

In aspects set forth herein, systems and methods are provided for monitoring and controlling energy usage and user throughput in telecommunications networks. More particularly, in aspects set forth herein, systems and methods enable a carrier to be turned on or off according to customer demand. In the context of cellular networks, optimizing spectrum usage and network capacity is important for efficient operation and minimizing waste, including energy waste.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1A:
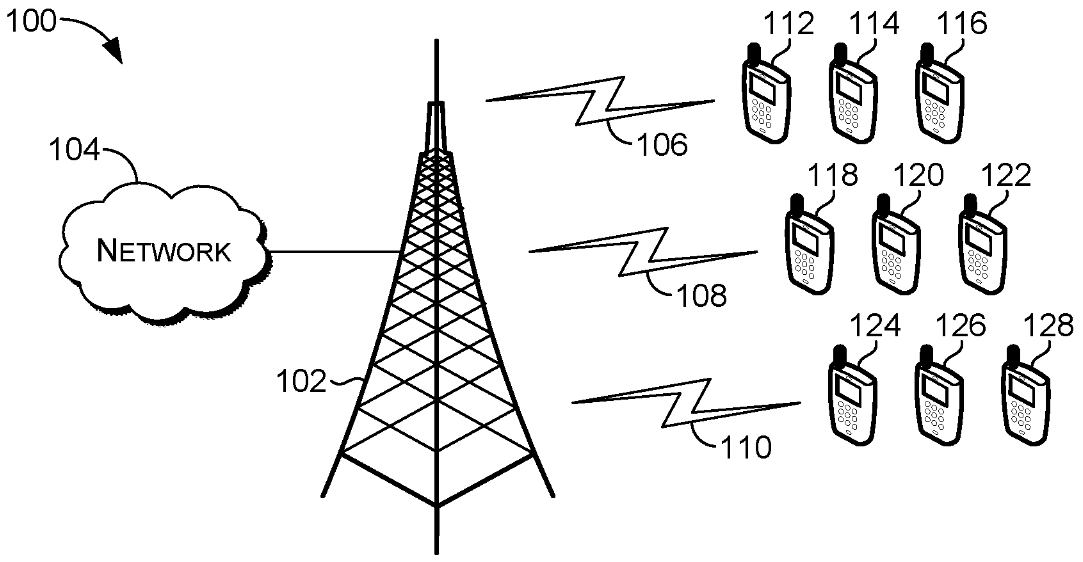
FIGS. 1A-1C depict diagrams of exemplary network environments in which implementations of the present disclosure may be employed, in accordance with aspects herein.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. The following is a list of these acronyms:

3G Third-Generation Wireless Technology
4G Fourth-Generation Cellular Communication System
5G Fifth-Generation Cellular Communication System
AMF Access & Mobility Management Function
APN Access Point Name
CD-ROM Compact Disk Read Only Memory
CDMA Code Division Multiple Access
eNodeB Evolved Node B
GIS Geographic/Geographical/Geospatial Information System
gNodeB Next Generation Node B
GPRS General Packet Radio Service
GSM Global System for Mobile communications
iDEN Integrated Digital Enhanced Network
DVD Digital Versatile Discs
EEPROM Electrically Erasable Programmable Read Only Memory
LED Light Emitting Diode
LTE Long Term Evolution
MIMO Multiple Input Multiple Output
MD Mobile Device
PC Personal Computer
PCF Policy Control Function
PCS Personal Communications Service
PDA Personal Digital Assistant
RAM Random Access Memory
RET Remote Electrical Tilt
RF Radio-Frequency
RFI Radio-Frequency Interference
R/N Relay Node
ROM Read Only Memory
SINR Signal-to-Interference-Plus-Noise Ratio
SMF Session Management Function
SNR Signal-to-Noise Ratio
SON Self-Organizing Networks
TDMA Time Division Multiple Access
TXRU Transceiver (or Transceiver Unit)
UDM Unified Data Management Function
UDR Unified Data Repository
UE User Equipment
UPF User Plane Function Further, various technical terms are used throughout this description. An illustrative resource that fleshes out various aspects of these terms can be found in Newton's Telecom Dictionary, 32d Edition (2022).

As used herein, the term "node" is used to refer to network access technology for the provision of wireless telecommunication services from a base station to one or more electronic devices, such as an eNodeB, gNodeB, etc.

Embodiments of the present technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media.

Computer-readable media include both volatile and nonvolatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

As employed herein, a UE (also referenced herein as a user device) can include any device employed by an end-user to communicate with a wireless telecommunications network. A UE can include a mobile device, a mobile broadband adapter, or any other communications device employed to communicate with the wireless telecommunications network. A UE, as one of ordinary skill in the art may appreciate, generally includes one or more antenna coupled to a radio for exchanging (e.g., transmitting and receiving) transmissions with a nearby base station.

By way of background, network traffic can vary based on the time of day. The network may be more loaded during the day and less loaded in the middle of the night. Currently, the same amount of spectrum is available to customers regardless of the demand and network load. For example, the spectrum could be at capacity during the day based on the amount of customers on their UE. However, at night, each line of spectrum may have a fraction of the customers connected. Yet, the same amount of energy is being used, which is not an efficient use of energy.

By prioritizing and loading up each line of spectrum before turning on a new line, energy can be conserved and customer experience (e.g., throughput) can remain consistent. The telecommunications network could output the amount of energy demanded by the customer, rather than using the same amount of energy regardless of the demand. In other words, the network would dynamically combine spectrum assets and turn off carriers when they are not needed. Maintaining a balance between supply and demand is crucial for ensuring the stability and reliability of the telecommunications network, as well as minimizing energy consumption.

Accordingly, the present disclosure is directed to systems and methods for optimizing spectrum usage based on user throughput and/or traffic within a telecommunication network to reduce unnecessary radio operation during lower and/or non-traffic times. Telecommunications networks and their associated nodes (e.g., eNodeB base stations) are historically designed to operate over a maximum number of frequencies at full power in order to ensure a quality of service standard for their associated customers. Excessive radio operation during lower or non-traffic time causes unnecessary waste (e.g., increased operational costs) and harmful interference between nodes. Based on user throughput and/or traffic, an eNodeB may determine which frequency bands and/or channels are being used at the desired capacity level and which frequency bands can be turned off (i.e., deactivated), or reduced in power, such that there is a reduced interference impact on the surrounding nodes and/or cells and that the coverage provided to users operating on the network is not detrimentally affected.

A first aspect of the present disclosure is directed to a system for optimizing energy consumption in a telecommunications network, the system comprising one or more processors and one or more computer-readable media storing computer-usable instructions that, when executed by the one or more processors, cause the one or more processors to monitor a real-time supply data and a real-time demand data within the telecommunications network, wherein the real-time supply data comprises information related to generation and distribution of one or more lines of spectrum, and the real-time demand data comprises information related to a consumption of a spectral energy by a plurality of devices. The system also comprises analyzing the monitored real-time supply data and real-time demand data. The system also comprises adjusting an output of the spectral energy within the telecommunications network to make the real-time supply data match the real-time demand data, wherein an output adjustment is made in real-time based on fluctuations in the real-time supply data and a real-time demand data.

A second aspect of the present disclosure is directed a method for optimizing energy consumption in a telecommunications network, the method comprising monitoring a real-time supply data a real-time demand data within the telecommunications network, wherein the real-time supply data comprises information related to generation and distribution of one or more lines of spectrum, and the real-time demand data comprises information related to a consumption of a spectral energy by a plurality of devices. The method also comprises analyzing the monitored real-time supply data and the real-time demand data. The method also comprises adjusting an output of the spectral energy within the telecommunications network to make the real-time supply data match the real-time demand data, wherein an output adjustment is made in real-time based on fluctuations in the real-time supply data a real-time demand data.

A third aspect of the present disclosure is directed to a system for optimizing energy consumption in a telecommunications network, the system comprising one or more processors and one or more computer-readable media storing computer-usable instructions that, when executed by the one or more processors, cause the one or more processors to monitor a real-time supply data a real-time demand data within the telecommunications network, wherein the real-time supply data comprises information related to generation and distribution of a line of spectrum, and the real-time demand data comprises information related to a consumption of a spectral energy by a plurality of devices. The system also comprises analyzing the monitored real-time supply data and real-time demand data to detect when a capacity limit of an existing spectrum line has been reached. The system also comprises opening an additional spectrum line to receive excess demand, based on the capacity limit being reached.

Another aspect of the present disclosure is directed to a system for managing UE throughput in a telecommunications network, the system comprising one or more processors and one or more computer-readable media storing computer-usable instructions that, when executed by the one or more processors, cause the one or more processors to monitor a real-time supply data a real-time demand data within the telecommunications network, wherein the real-time supply data comprises information related to generation and distribution of one or more lines of spectrum, and the real-time demand data comprises information related to a consumption of a spectral energy by a plurality of devices. The system also comprises analyzing the monitored real-time supply data and real-time demand data. The system also comprises determining that a capacity limit of an existing spectrum line is within a predetermined threshold based on the monitored real-time supply data and real-time demand data. The system also comprises determining an average throughput from each of an average of UEs connected to a base station. The system also comprises adjusting an output of spectral energy by activating or deactivating one or more additional cells based on a determination that the average throughput is either above or below a predetermined threshold in order to keep the average throughput constant.

In one example, a base station within a telecommunication network may operate using multiple unique frequency bands and/or channels. For example, a base station providing service to an area including a school may encounter peak traffic times during school hours (e.g., 8:00 A.M. to 3:00 P.M.) and may encounter lower traffic, or no traffic, at night time. Similarly, a base station providing service to a shopping center may experience peak traffic times during operating hours of the shopping center, as opposed to when the shopping center is closed.

In aspects, a base station (e.g., eNodeB) can monitor raw data associated with its node and/or cell, such as how many UEs are operating on and/or are attached to a particular frequency band and/or channel associated with the node and/or cell (i.e., a real-time demand-data). This monitored data can include the traffic level as well as the throughput level of each frequency band. The eNodeB may continuously and/or periodically check the traffic level and throughput level every minute, few minutes, every hour, or the like. Using the raw data, the eNodeB can determine an average throughput level associated with its node and/or cell, such as, the characteristics of the radio environment and the behavior of the connected UEs. Additionally, the eNodeB can monitor a real-time supply data and a real-time demand data within the telecommunications network, where the real-time supply data comprises information related to generation and distribution of one or more lines of spectrum (e.g., frequency bands), and the real-time demand data comprises information related to a consumption of spectral energy being consumed by the connected UEs. The eNodeB can analyze and compare the real-time supply data (e.g., supply values) to the real-time demand data (e.g., demand values) and then dynamically adjust an output of the spectral energy within the telecommunications network to align the supply values and demand values (e.g., make a supply value equivalent to/match a demand value). This adjustment can be made in real-time based on fluctuations in the real-time supply data and the real-time demand data.

In aspects, a demand-side management technique can be implemented to modify an end-user energy consumption behavior, wherein the demand-side management technique includes load shifting and/or energy efficiency measures. The load shifting measures can prioritize filling available capacity, which refers to the maximum amount of data that can be transmitted over an existing line of spectrum, before opening a new line of spectrum. In some cases, the eNodeB may determine that the traffic level and/or throughput level associated with a frequency band and/or channel is less than, equal to, or greater than a predetermined threshold for activating or deactivating the frequency band and/or channel. For example, when the existing line of spectrum reaches the desired capacity (e.g., "near full capacity," as further discussed below), the output of spectral energy can be adjusted by adding a new line of spectrum to match the user demand. Alternatively, when the new line of spectrum is determined to have less than the desired capacity, the output of spectral energy can be adjusted by deactivating the new line of spectrum to match the user demand and save energy.

In some examples, the traffic level associated with a frequency band and/or channel is greater than the determined traffic handling capacity of the frequency band and/or channel, and/or is near or close to the determined traffic handling capacity. In such situations, the eNodeB may determine that a previously deactivated frequency band and/or channel can be activated and/or increased in power. In other words, the eNodeB may determine that the traffic load associated with a frequency band and/or channel is greater than a pre-determined threshold and/or the throughput level is below a pre-determined average threshold. In this example, the frequency band and/or channel has reached capacity or is above the desired "near full capacity" (further discussed below). The output of spectral energy can be adjusted to make the customer supply match the customer demand by moving UEs from the existing line of spectrum to a new line of spectrum. By moving the UEs to a new line of spectrum, there will be less traffic on the existing line of spectrum and therefore a higher throughput.

Similarly, the traffic level associated with a frequency band and/or channel can be less than the determined traffic handling capacity of the frequency band and/or channel. If the traffic level is less than the determined traffic level capacity, then the average throughput level may be above a predetermined threshold. In this example, the eNodeB may determine that the frequency band and/or channel can be deactivated and/or reduced in power. In other words, the output of spectral energy (e.g., supply) can be adjusted to match customer demand by moving UEs from a first frequency band (e.g., line of spectrum) to a second frequency band and disabling the first frequency band.

To determine which frequency bands and/or channels should be deactivated and/or reduced in power, there can be a ranking of each of the frequency bands at the base station based at least in part on an interference level and/or energy level associated with the one or more frequency bands. The network may generate a list of candidate frequency bands and/or channels to deactivate and/or activate based on the determined traffic levels associated with the frequency bands and/or channels and the determined traffic handling capacities associated with the frequency bands and/or channels. Once the list of candidate frequency bands and/or channels is generated, the network may perform an interference impact analysis to determine an interference impact associated with each frequency band and/or channel relative to another node and/or cell. For example, the network may access interference tables associated with each frequency band and/or channel and may rank the list of candidate frequency bands and/or channels based on the information stored in the interference table. The network may rank the list of candidate frequency bands and/or channels based on minimizing the interference within the telecommunication network. For example, a first frequency band and a second frequency band may both be determined to be operating with more traffic handling capacity than their respective associated traffic level, and thus, be candidates to be deactivated and/or reduced in power.

Figure 1B:
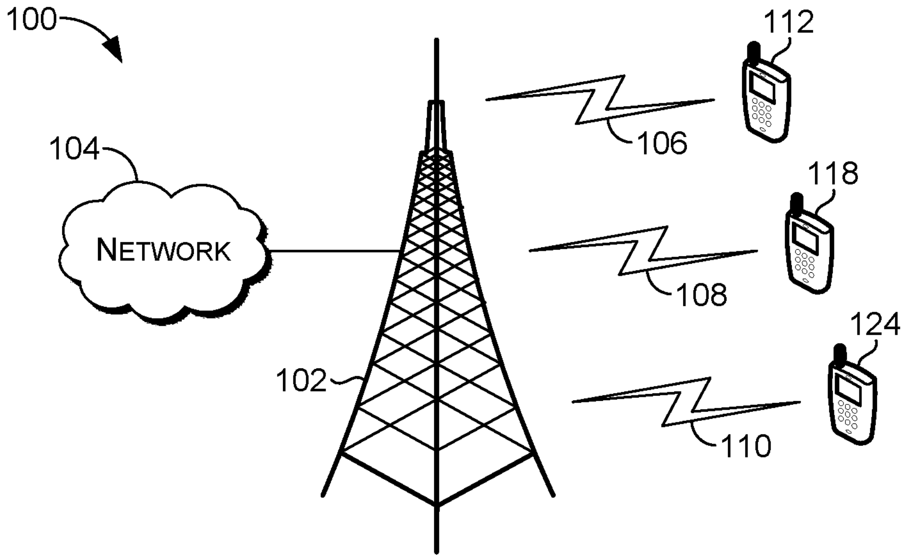
Figure 1C:
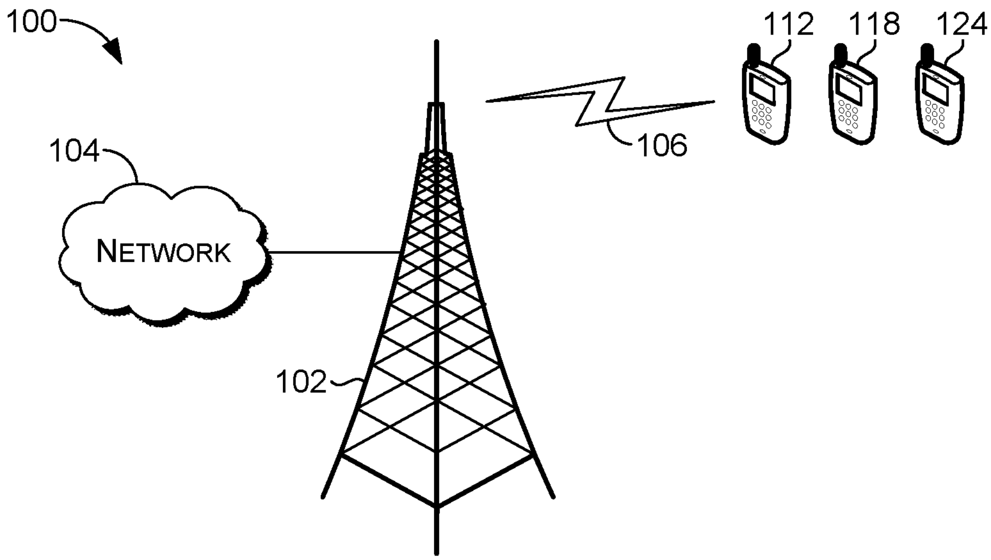

Turning to FIGS. 1A-1C, a network environment suitable for use in implementing embodiments of the present disclosure is provided. Such a network environment is illustrated and designated generally as network environment 100. Network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

Figure 4:
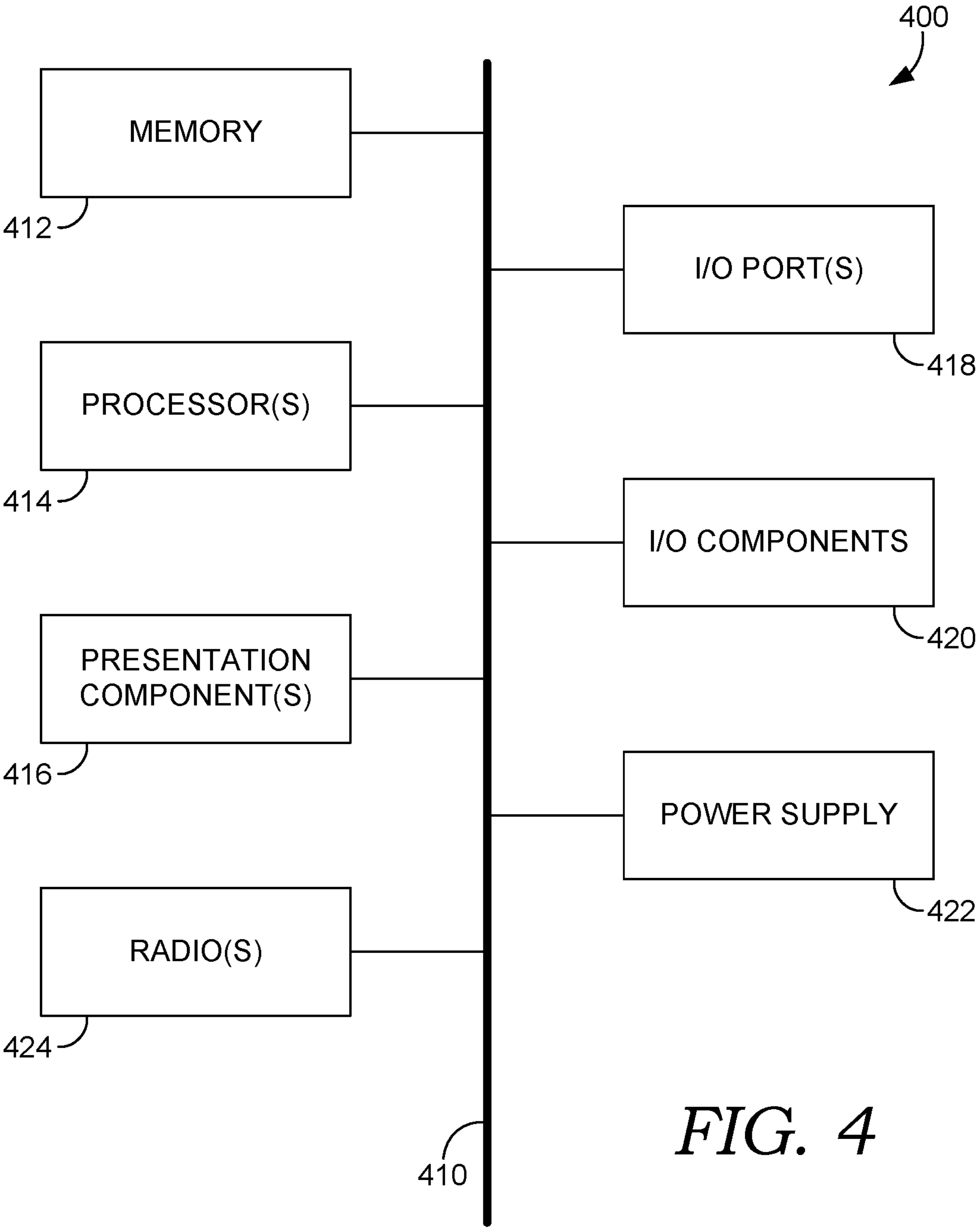
FIG. 4 depicts a diagram of an exemplary computing environment suitable for use in implementations of the present disclosure, in accordance with aspects herein.

A network cell, such as network environment 100, may comprise a base station 102 to facilitate wireless communication between a communications device within the network cell, such as communications device 400 described with respect to FIG. 4, and a network. As shown in FIG. 1, communications device may be an one or more of UEs 112, 114, 116, 118, 120, 122, 124, 126, and 128. In the network environment 100, UEs 112, 114, 116, 118, 120, 122, 124, 126, and 128 may communicate with other devices, such as mobile devices, servers, etc. The UEs 112, 114, 116, 118, 120, 122, 124, 126, and 128 may take on a variety of forms, such as a personal computer, a laptop computer, a tablet, a netbook, a mobile phone, a Smart phone, a personal digital assistant, or any other device capable of communicating with other devices. For example, the UEs 112, 114, 116, 118, 120, 122, 124, 126, and 128 may take on any form such as, for example, a mobile device or any other computing device capable of wirelessly communication with the other devices using a network. In embodiments, the UEs 112, 114, 116, 118, 120, 122, 124, 126, and 128 comprise a wireless or mobile device with which a wireless telecommunication network(s) can be utilized for communication (e.g., voice and/or data communication). In this regard, the UEs 112, 114, 116, 118, 120, 122, 124, 126, and 128 can be any mobile computing device that communicates by way of, for example, a 5G network.

The UEs 112, 114, 116, 118, 120, 122, 124, 126, and 128 may utilize a network to communicate with other computing devices (e.g., mobile device(s), a server(s), a personal computer(s), etc.). In embodiments, the network is a telecommunications network, or a portion thereof. A telecommunications network might include an array of devices or components, some of which are not shown so as to not obscure more relevant aspects of the invention. Components such as terminals, links, and nodes (as well as other components) may provide connectivity in some embodiments. The network may include multiple networks. The network may be part of a telecommunications network that connects subscribers to their immediate service provider. In embodiments, network environment 100 is associated with a telecommunications provider that provides services to user devices, such as UEs 112, 114, 116, 118, 120, 122, 124, 126, and 128. For example, the network may provide voice services to user devices or corresponding users that are registered or subscribed to utilize the services provided by a telecommunications provider.

The network environment 100 comprises a base station 102 with one or more frequency bands to which the UEs 112, 114, 116, 118, 120, 122, 124, 126, and 128 may potentially connect to (also referred to as ‘camping on’, ‘attaching’ in the industry). Though the network environment 100 is illustrated with one base station 102, one skilled in the art will appreciate that more base stations may be present in any particular network environment. The base station 102 of network environment 100 may comprise one or more of a first line of spectrum 106, a second line of spectrum 108, and a third line of spectrum 110 (also referred to in this disclosure as “frequency bands” as used interchangeably hereinafter). While three lines of spectrum are illustrated in FIG. 1 for clarity, the environment 100 can have fewer than or more than three lines of spectrum and is not limited to the illustrated drawing. Each of the one or more frequency bands of network environment 100 have a unique frequency and are configured to wirelessly communicate with UEs, such as the UEs 112, 114, 116, 118, 120, 122, 124, 126, and 128. The output of spectral energy from the lines of spectrum 106, 108, 110 is based on one or more frequency bands operated on base station 102. Any of the one or more base stations may communicate with a UE using any wireless telecommunication protocol desired by a network operator, including but not limited to 3G, 4G, 5G, 6G, 802.11x and the like. In some implementations, each of the one or more base stations is configured to communicate with one or more UEs located within a geographical area. The geographical area for any particular base station may be referred to as the “coverage area” of the base station or simply the “cell,” as used interchangeably hereinafter. In some aspects, the coverage area for each particular base station is defined by an area in which signaling between a particular UE and the base station is usable for any purpose; in other aspects, the coverage area may be defined by mobile network operators. Generally, each base station may comprise one or more base transmitter stations, radios, antennas, antenna arrays, power amplifiers, transmitters/receivers, digital signal processors, control electronics, GPS equipment, and the like.

The base station 102 is configured to transmit downlink signals to one or more UEs, such as the UEs 112, 114, 116, 118, 120, 122, 124, 126, and 128 and to receive uplink signals therefrom. Specifically, the downlink signals from a particular base station may comprise one or more sets of synchronization signals that serve to provide information about that particular base station, such as primary synchronization signals (PSS), secondary synchronization signals (SSS), and physical broadcast channel (PBCH) signals. The downlink signals may additionally comprise various other control and broadcast signaling in addition to physical downlink shared channel (PDSCH) signaling.

The base station 102 may be associated with one or more at least partially distinct networks, wherein each network is associated with one or more network identifiers. Each network may be a telecommunications network(s) (e.g., a packet data network or core network), data network, or portions thereof. A telecommunications network that at least partially comprises the network environment 100 may include additional devices or components (e.g., one or more base stations) not shown. Those devices or components may form network environments similar to what is shown in FIGS. 1A, 1B, and 1C, and may also perform methods in accordance with the present disclosure. Components such as terminals, links, and nodes (as well as other components) may provide connectivity in various implementations. For the purposes of illustrating the present disclosure, the base station 102 may be connected to the network 104. The network 104 may include multiple networks, as well as being a network of networks, but is shown in more simple form so as to not obscure other aspects of the present disclosure.

FIGS. 1A, 1B, and 1C are examples of the same network environment 100 at three different points in time. In aspects, FIG. 1A depicts the network environment 100 at a first time (e.g., peak time). For example, the base station 102 within the network environment 100 may operate using multiple unique frequency bands and/or channels (e.g., 106, 108, and 110) when providing telecommunications services to the UEs 112, 114, 116, 118, 120, 122, 124, 126, and 128. In aspects, UEs 112, 114, and 116 are connected to frequency band 106, UEs 118, 120, and 122 are connected to frequency band 108, and UEs 124, 126, and 128 are connected to frequency band 110. For purposes of this disclosure, and simplicity, three UEs per frequency band will be considered "near full capacity" for the frequency band. The term "near full capacity" for a frequency band on a base station refers generally to a state where both the traffic and throughput levels are optimized to deliver excellent customer experience while ensuring efficient spectral utilization without wasting energy. For traffic optimization, near full capacity, as used herein, refers generally to the base station efficiently utilizing its bandwidth allocation to accommodate the current traffic load without causing congestion or delays for users. For throughput maximization, near full capacity, as used herein, refers generally to the base station achieving high data rates and reliable communication links, allowing UEs to transmit and receive data at optimal speeds without experiencing performance degradation. For spectral efficiency, near full capacity refers generally to ensuring that the frequency band is utilized efficiently, minimizing spectral waste and maximizing the use of available spectrum resourced. As is illustrated in FIG. 1A, all three frequency bands 106, 108, and 110 are at near full capacity.

Turning now to FIG. 1B, the network environment 100 is depicted at a second time (e.g., lower traffic time). Each of the different frequency bands 106, 108, and 110 only have one UE 112, 118, or 124 connected thereto. In this example, each of the frequency bands 106, 108, and 110 are being underutilized and are under capacity. In an underutilized scenario, there is a low volume of data traffic being served by the base station 102, resulting in idle or underutilized network resources, which, in turn, results in spectral waste and an average throughput that is above a predetermined threshold. In other words, the traffic and throughput levels are significantly below the maximum capacity that the base station 102 and frequency bands 106, 108, and 110 can support.

Turning now to FIG. 1C, the UEs 112, 118, and 124 from FIG. 1B can connect to the same frequency band 106. The base station 102 can dynamically allocate frequency channels and adjust transmission parameters to match traffic demand and user throughput while avoiding unnecessary idle time or unused bandwidth. For example, in FIG. 1B, because the frequency bands of spectrum 108 and 110 were determined to have less than the desired capacity, the output of spectral energy was adjusted by deactivating frequency bands 108 and 110 and moving the UEs utilizing those bands onto frequency band 106 to match the user demand and save energy (shown in FIG. 1C).

Although not shown, continuing with FIG. 1C, if a fourth UE tried to connect to frequency band 106, because frequency band 106 is at capacity, a new frequency band (e.g., 108 or 110) can be re-activated. In other words, the output of spectral energy can be adjusted by adding a new line of spectrum to match the user demand. Put another way, if a new UE were to connect to the base station 102, the demand value would exceed the supply value so another band would need to be activated (e.g., the capacity threshold of band 106 would exceed a predetermined threshold and, thus, a new band is needed).

Figure 2A:
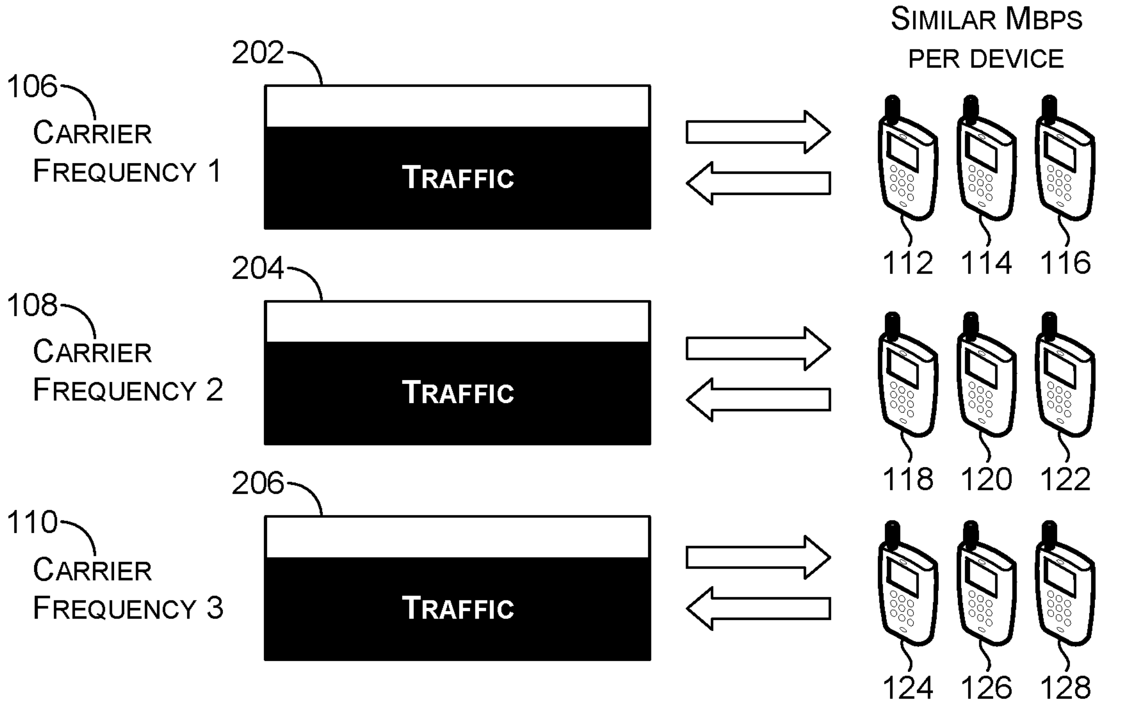
FIGS. 2A-2C depict an alternative view of FIGS. 1A-1C in which implementations of the present disclosure may be employed, in accordance with aspects herein.
Figure 2B:
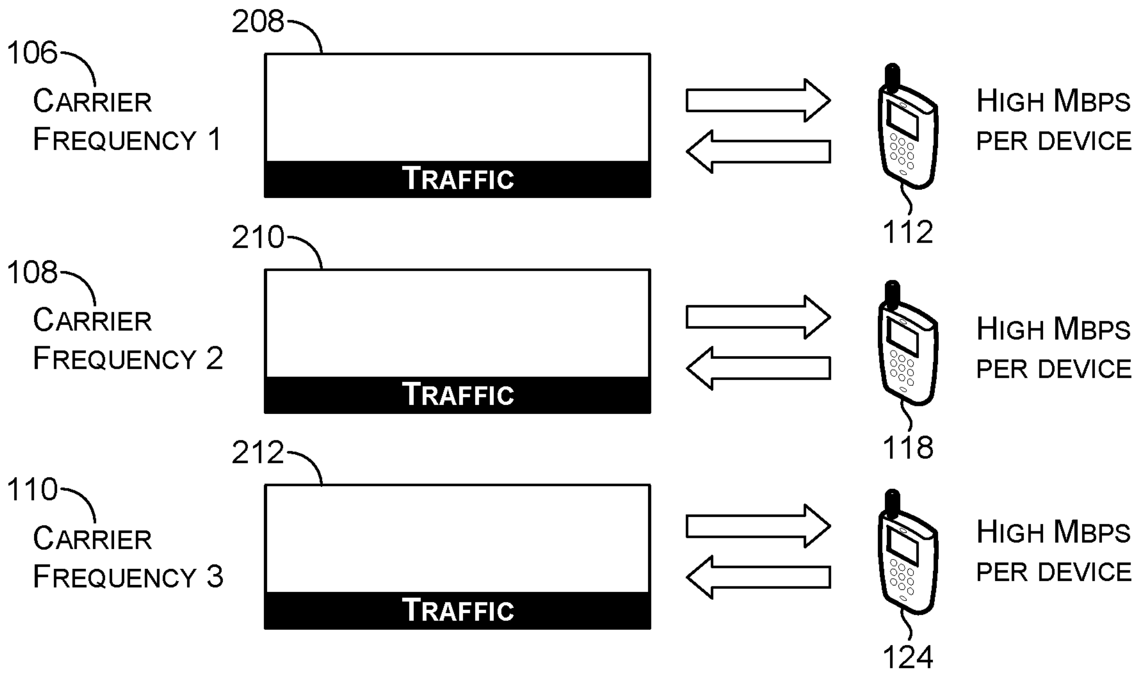
Figure 2C:
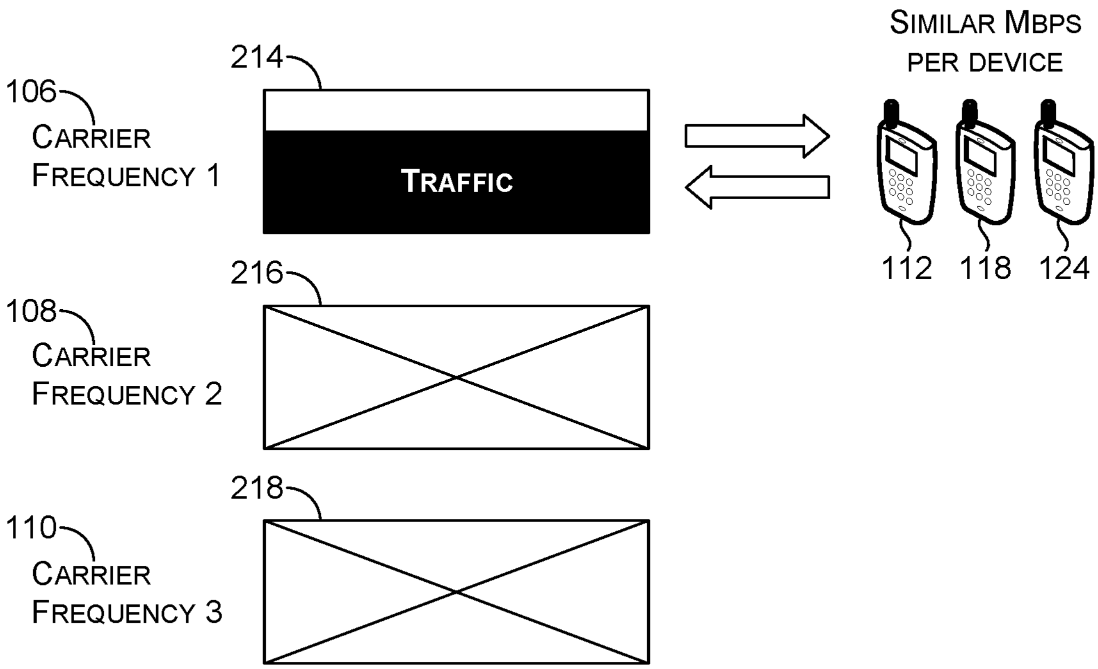

In an alternative view, referencing the previous example, FIGS. 2A-2C are provided. FIG. 2A is an alternative view of FIG. 1A. In aspects, UEs 112, 114, and 116 are connected to frequency band 106 with traffic load 202, UEs 118, 120, and 122 are connected to frequency band 108 with traffic load 204, and UEs 124, 126, and 128 are connected to frequency band 110 with traffic load 206. In aspects, the traffic load depicted by 202, 204, and 206 illustrates an ideal traffic load (e.g., near full capacity) where both the traffic load and the throughput are within a predetermined threshold. FIG. 2B is an alternative view of FIG. 1B. As depicted by FIG. 1B, the traffic loads 208, 210, and 212 are below a predetermined threshold, meaning the throughput is above a predetermined threshold. As discussed above, the eNodeB may then determine that a plurality of frequency bands and/or channels can be deactivated and/or reduced in power. In other words, the output of spectral energy (e.g., supply) can be adjusted to match customer demand by moving UEs 118 and 124 from frequency bands 108 and 110 to frequency band 106 and disabling frequency bands 108 and 110, as depicted in FIG. 2C. By disabling or deactivating frequency bands 108 and 110, network energy is saved while maintaining a constant UE throughput.

Figure 3:
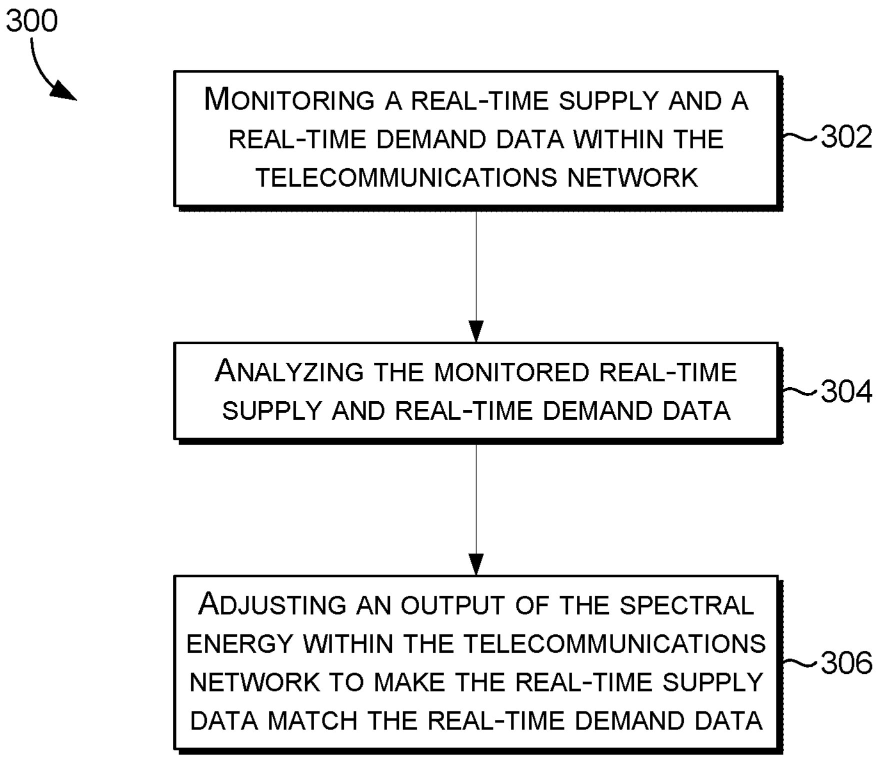
FIG. 3 depicts a flow diagram of a method optimizing energy consumption in a telecommunications network, in accordance with aspects herein.

Turning to FIG. 3, a flow diagram 300 is provided illustrating a flow for optimizing energy consumption in a telecommunications network. Initially, at block 302, the gNodeB monitors a real-time supply data and a real-time demand data within the telecommunications network. At block 304, the gNodeB analyzes the monitored real-time supply data and the real-time demand data. At block 306, the gNodeB adjusts an output of the spectral energy within the telecommunications network to make the real-time supply data match the real-time demand data.

Referring to FIG. 4, a block diagram of an exemplary computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. It should be noted that although some components in FIG. 4 are shown in the singular, they may be plural. For example, the computing device 400 might include multiple processors or multiple radios. In aspects, the computing device 400 may be a UE, or other user device, capable of two-way wireless communications with an access point. Some non-limiting examples of the computing device 400 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 4, computing device 400 includes a bus 410 that directly or indirectly couples various components together, including memory 412, processor(s) 414, presentation component(s) 416 (if applicable), radio(s) 424, input/ output (I/O) port(s) 418, input/output (I/O) component(s) 420, and power supply(s) 422. Although the components of FIG. 4 are shown with lines for the sake of clarity, in reality, delineating various components is not so clear, and metaphorically, the lines would more accurately be grey and fuzzy. For example, one may consider a presentation component such as a display device to be one of I/O components 420. Also, processors, such as one or more processors 414, have memory. The present disclosure hereof recognizes that such is the nature of the art, and reiterates that FIG. 4 is merely illustrative of an exemplary computing environment that can be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 412 may take the form of memory components described herein. Thus, further elaboration will not be provided here, but it should be noted that memory 412 may include any type of tangible medium that is capable of storing information, such as a database. A database may be any collection of records, data, and/or information. In one embodiment, memory 412 may include a set of embodied computer-executable instructions that, when executed, facilitate various functions or elements disclosed herein. These embodied instructions will variously be referred to as "instructions" or an "application" for short.

Processor 414 may actually be multiple processors that receive instructions and process them accordingly. Presentation component 416 may include a display, a speaker, and/or other components that may present information (e.g., a display, a screen, a lamp (LED), a graphical user interface (GUI), and/or even lighted keyboards) through visual, auditory, and/or other tactile cues.

Radio 424 represents a radio that facilitates communication with a wireless telecommunications network. Illustrative wireless telecommunications technologies include CDMA, GPRS, TDMA, GSM, and the like. Radio 424 might additionally or alternatively facilitate other types of wireless communications including Wi-Fi, WiMAX, LTE, 3G, 4G, LTE, mMIMO/5G, NR, VoLTE, or other VoIP communications. As can be appreciated, in various embodiments, radio 424 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

The input/output (I/O) ports 418 may take a variety of forms. Exemplary I/O ports may include a USB jack, a stereo jack, an infrared port, a firewire port, other proprietary communications ports, and the like. Input/output (I/O) components 420 may comprise keyboards, microphones, speakers, touchscreens, and/or any other item usable to directly or indirectly input data into the computing device 400.

Power supply 422 may include batteries, fuel cells, and/or any other component that may act as a power source to supply power to the computing device 400 or to other network components, including through one or more electrical connections or couplings. Power supply 422 may be configured to selectively supply power to different components independently and/or concurrently.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and sub combinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized, and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for optimizing energy consumption in a telecommunications network, the system comprising:

one or more processors; and one or more computer-readable media storing computer-usable instructions that, when executed by the one or more processors, cause the one or more processors to:

monitor a real-time supply data and a real-time demand data within the telecommunications network, wherein the real-time supply data comprises information related to generation and distribution of one or more lines of spectrum, and the real-time demand data comprises information related to a consumption of a spectral energy by a plurality of devices;

analyze the monitored real-time supply data and real-time demand data;

determine an average throughput from user equipment connected to a base station associated with the telecommunications network; and adjust an output of the spectral energy within the telecommunications network based on the determined average throughput, wherein the output adjustment comprises deactivating one or more frequency bands when the determined average throughput exceeds a predetermined threshold, and wherein the output adjustment is made in real-time based on fluctuations in the real-time supply data and a real-time demand data.

2. The system of claim 1, further comprising implementing a demand-side management technique to modify an end-user energy consumption behavior, wherein the demand-side management technique includes load shifting or energy efficiency measures.

3. The system of claim 2, wherein the load shifting measures prioritize filling available capacity of an existing line of spectrum before opening a new line of spectrum.

4. The system of claim 3, further comprising adjusting the output of spectral energy by moving a user equipment of a plurality of user equipment from the new line of spectrum to the existing line of spectrum and disabling the new line of spectrum.

5. The system of claim 3, further comprising adjusting the output of spectral energy by moving a user equipment of a plurality of user equipment from the existing line of spectrum to the new line of spectrum once the existing line of spectrum has reached capacity.

6. The system of claim 3, further comprising activating the new line of spectrum once the existing line of spectrum has reached capacity.

7. The system of claim 1, wherein the output of spectral energy is based on one or more frequency bands operated on a base station associated with the telecommunications network.

8. The system of claim 1, further comprising continuously monitoring and adjusting the output of spectral energy based on changes in the real-time supply data and the real-time demand data.

9. The system of claim 1, further comprising controlling the distribution of the spectral energy within the telecommunications network such that a total supplied spectral energy matches a total consumed spectral energy.

10. The system of claim 1, further comprising ranking each of the one or more lines of spectrum based at least in part on an interference level associated with each of the one or more lines of spectrum.

11. A method for optimizing energy consumption in a telecommunications network, the method comprising:

monitoring a real-time supply data and a real-time demand data within the telecommunications network, wherein the real-time supply data comprises information related to generation and distribution of one or more lines of spectrum, and the real-time demand data comprises information related to a consumption of a spectral energy by a plurality of devices;

analyzing the monitored real-time supply data and real-time demand data;

determining an average throughput from user equipment connected to a base station associated with the telecommunications network; and adjust an output of the spectral energy within the telecommunications network based on the determined average throughput, wherein the output adjustment comprises deactivating one or more frequency bands when the determined average throughput exceeds a predetermined threshold, and wherein the output adjustment is made in real-time based on fluctuations in the real-time supply data and a real-time demand data.

12. The method of claim 11, further comprising implementing a demand-side management technique to modify an end-user energy consumption behavior, wherein the demand-side management technique includes load shifting or energy efficiency measures.

13. The method of claim 12, wherein the load shifting measures prioritize filling available capacity of an existing line of spectrum before opening a new line of spectrum.

14. The method of claim 13, further comprising adjusting the output of spectral energy by moving a user equipment of a plurality of user equipment from the new line of spectrum to the existing line of spectrum and disabling the new line of spectrum.

15. The method of claim 13, further comprising adjusting the output of spectral energy by moving a user equipment of a plurality of user equipment from the existing line of spectrum to the new line of spectrum once the existing line of spectrum has reached capacity.

16. The method of claim 13, further comprising activating the new line of spectrum once the existing line of spectrum has reached capacity.

17. The method of claim 11, wherein the output of spectral energy is based on one or more frequency bands operated on a base station associated with the telecommunications network.

18. The method of claim 11, further comprising continuously monitoring and adjusting the output of spectral energy based on changes in the real-time supply data and the real-time demand data.

19. The method of claim 11, further comprising controlling the distribution of the spectral energy within the telecommunications network such that a total supplied spectral energy matches a total consumed spectral energy.

20. A system for managing UE throughput in a telecommunications network, the system comprising:

one or more processors; and one or more computer-readable media storing computer-usable instructions that, when executed by the one or more processors, cause the one or more processors to:

monitor a real-time supply data and a real-time demand data within the telecommunications network, wherein the real-time supply data comprises information related to generation and distribution of a line of spectrum, and the real-time demand data comprises information related to a consumption of a spectral energy by a plurality of devices;

analyze the monitored real-time supply data and real-time demand data;

based on the monitored real-time supply data and real-time demand data, determine that a capacity limit of an existing spectrum line is within a predetermined threshold;

determine an average throughput from each of an average of user equipment connected to a base station;

based on a determination that the average throughput is above a predetermined threshold, adjust an output of the spectral energy by deactivating one or more frequency bands, each of the one or more frequency bands having a unique frequency.

* * * * *